(12) United States Patent
Kharchenko et al.

(10) Patent No.: US 11,053,344 B2
(45) Date of Patent: Jul. 6, 2021

(54) HYBRID COMPOSITION

(71) Applicant: BASF SE, Ludwigshafen am Rhein (DE)

(72) Inventors: Semen Kharchenko, Ann Arbor, MI (US); Janine Luesing, Wyandotte, MI (US); Shyam Sathyanarayana, Dearborn, MI (US)

(73) Assignee: BASF SE, Ludwigshafen am Rhein (DE)

(*) Notice: Subject to any disclaimer, the term of this patent is extended or adjusted under 35 U.S.C. 154(b) by 170 days.

(21) Appl. No.: 16/316,201

(22) PCT Filed: Jun. 30, 2017

(86) PCT No.: PCT/US2017/040382
§ 371 (c)(1),
(2) Date: Jan. 8, 2019

(87) PCT Pub. No.: WO2018/009452
PCT Pub. Date: Jan. 11, 2018

(65) Prior Publication Data
US 2020/0332051 A1 Oct. 22, 2020

Related U.S. Application Data

(60) Provisional application No. 62/359,994, filed on Jul. 8, 2016.

(51) Int. Cl.
| | | |
|---|---|---|
| *C08G 18/68* | (2006.01) |
| *C08G 18/16* | (2006.01) |
| *C08G 18/36* | (2006.01) |
| *C08G 18/76* | (2006.01) |
| *C08J 5/04* | (2006.01) |
| *C08L 75/14* | (2006.01) |

(52) U.S. Cl.
CPC .......... *C08G 18/68* (2013.01); *C08G 18/168* (2013.01); *C08G 18/36* (2013.01); *C08G 18/7664* (2013.01); *C08J 5/04* (2013.01); *C08L 75/14* (2013.01); *C08J 2375/14* (2013.01)

(58) Field of Classification Search
CPC . C08G 18/68; C08G 18/36; C08J 5/04; C08L 75/14
See application file for complete search history.

(56) References Cited

U.S. PATENT DOCUMENTS

| | | | |
|---|---|---|---|
| 3,683,303 A * | 8/1972 | Ayano | C08L 75/04 336/96 |
| 3,723,370 A | 3/1973 | Watanabe et al. | |
| 6,391,454 B1 * | 5/2002 | Mao | C05C 9/02 428/407 |
| 6,559,225 B1 | 5/2003 | Irle et al. | |

FOREIGN PATENT DOCUMENTS

| | | |
|---|---|---|
| CN | 1193635 A | 9/1998 |
| CN | 1360606 | 7/2002 |
| CN | 1362452 A | 7/2002 |
| CN | 102417779 A | 4/2012 |
| EP | 1043295 A2 | 10/2000 |
| EP | 1043295 * | 11/2000 |
| GB | 1217101 A | 12/1970 |
| JP | 48035760 * | 10/1973 |
| WO | 2014/113242 A1 | 7/2014 |

OTHER PUBLICATIONS

JP 48 035760 B (machine translation)(1973).*
International Search Report and Written Opinion from counterpart International Patent Application No. PCT/US2017/040382, dated Sep. 15, 2017.
International Preliminary Report on Patentability from counterpart International Patent Application No. PCT/US2017/040382, dated Jan. 17, 2019.
Cherian, A. Benny, et al., "Modification of Unsaturdated Polyester Resin by Polyurethane Prepolymers", *Journal of Applied Polymer Science*, vol. 100, 2006, pp. 449-456.
Communication pursuant to Article 94(3) EPC from counterpart EP Application No. 17740202.1 dated Nov. 26, 2020.
First Office Action from counterpart CN Application No. 201780055103 dated Nov. 4, 2020, and its English translation.

* cited by examiner

*Primary Examiner* — Kuo Liang Peng
(74) *Attorney, Agent, or Firm* — DLA Piper LLP (US)

(57) ABSTRACT

A hybrid composition includes an isocyanate, a polyester having at least one carbon-carbon double bond and at least one hydroxyl group, castor oil present in an amount of from 5 to 30 weight percent, a catalyst, and a solvent. The hybrid composition can be formed using various methods. The method may include combining the isocyanate and the castor oil to form a first adduct, combining the polyester, the solvent, and the catalyst to form a second adduct, and combining the first adduct and the second adduct. The method may alternatively include combining the castor oil, the solvent, and the polyester to form a third adduct, combining the third adduct with the isocyanate, and combining the catalyst with the third adduct and the isocyanate. The method may alternatively include combining the catalyst and the isocyanate component to form a fourth adduct, and combining the third and fourth adducts.

18 Claims, 1 Drawing Sheet

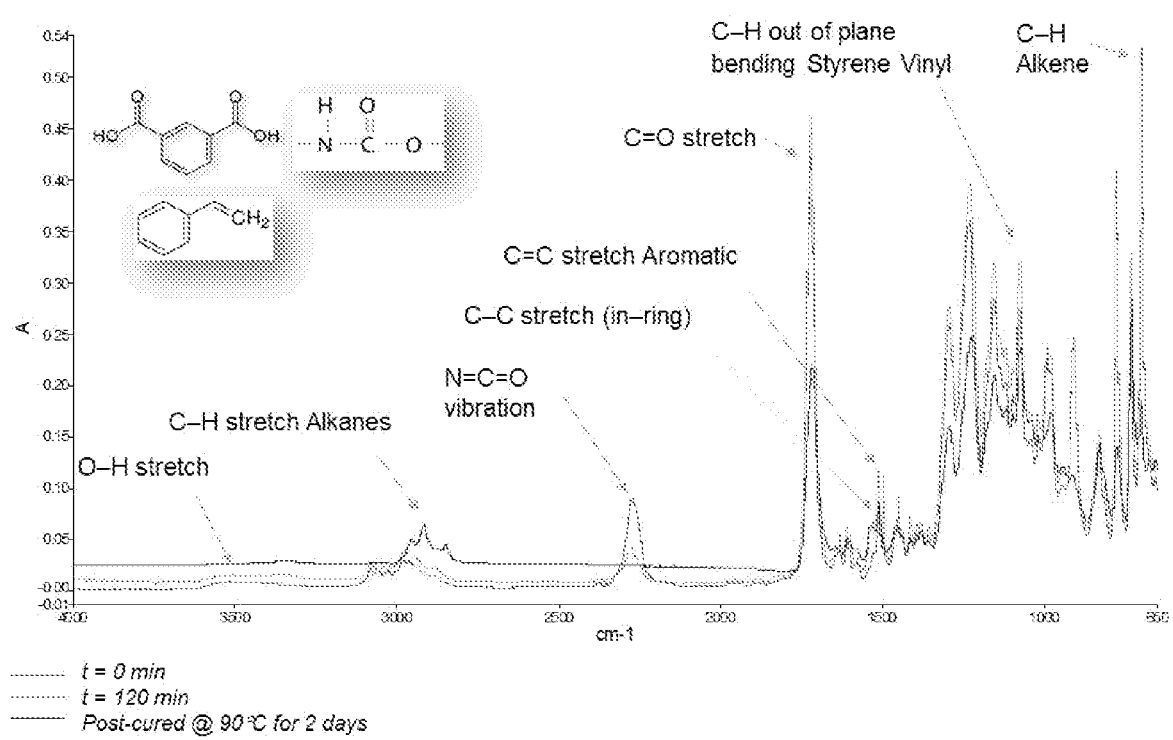

US 11,053,344 B2

HYBRID COMPOSITION

FIELD OF THE DISCLOSURE

The present disclosure generally relates to a hybrid composition that includes an isocyanate, a polyester, and castor oil. More specifically, the hybrid composition is used to form a polyurethane-polyester hybrid.

BACKGROUND

It is known that plastics and other rigid articles may be formed from mixtures of various polyesters, styrene, isocyanates, etc. However, most of these polyesters are viscous or solid resins. This makes them difficult to work with. Unsaturated polyesters have conventionally high rigidity and thermal resistance, but tend to be relatively brittle. Polyurethanes can also be used to form plastics and rigid articles. Polyurethanes, however, have their own disadvantages such as sensitivity to moisture. Moreover, simply adding a polyester to a polyurethane typically does not form a homogenous product and instead forms a product that remains susceptible to all of the disadvantages unique to both the polyester and the polyurethane individually. Accordingly, there remains an opportunity for improvement.

SUMMARY OF THE DISCLOSURE

This disclosure provides a hybrid composition comprising an isocyanate, a polyester having at least one carbon-carbon double bond and at least one hydroxyl group, castor oil present in an amount of from 5 to 30 weight percent based on a total weight of the composition, a catalyst, and a solvent. This disclosure also provides a polyester-polyurethane hybrid formed from the hybrid composition.

This disclosure also provides various methods of forming the hybrid composition. In one embodiment, the method includes the steps of combining the isocyanate and the castor oil to form a first adduct, combining the polyester, the solvent, and the catalyst to form a second adduct, and combining the first adduct and the second adduct to form the hybrid composition. In another embodiment, the method includes the steps of combining the castor oil, the solvent, and the polyester to form a third adduct, combining the third adduct with the isocyanate, and combining the catalyst with the third adduct and the isocyanate to form the hybrid composition. In a further embodiment, the method includes the steps of combining castor oil, the solvent, and the polyester to form the third adduct, combining the catalyst and the isocyanate component to form a fourth adduct, and combining the third and fourth adducts to form the hybrid composition.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 1 is an FT-IR scan of an isocyanate/polyester system curing over time wherein an isocyanate and a polyester having at least one —OH group react in a 1:1 stoichiometric ratio and the —NCO peak disappears indicating the reaction between the at least one —OH group of the polyester and the isocyanate molecules.

DETAILED DESCRIPTION OF THE DISCLOSURE

The present disclosure provides a hybrid composition (herein after described as the "composition".) The composition includes, is, consists of, or consists essentially of, an isocyanate, a polyester having at least one carbon-carbon double bond, castor oil present in an amount of from 5 to 30 weight percent based on a total weight of the composition, a catalyst, and a solvent. The terminology "consists essentially of" describes various embodiments that are free of one or more polymers, isocyanates, polyesters, polyethers, polyols, additives, catalysts, or solvents known in the art that are not one of the aforementioned isocyanates, polyesters, castor oil, catalyst, or solvent. In other words, the composition may be free of any one or more compounds known in the art that are not the polyester, isocyanate, castor oil, solvent, or catalyst of this disclosure.

The reactions of this disclosure can include a free-radical reaction of the polyester with itself; a reaction of the polyester, an unsaturated monomer, and castor oil; a reaction of the isocyanate and the castor oil; a reaction of the isocyanate, the castor oil, and a second polyol; and a reaction of the isocyanate, the polyester, and the castor oil, and optionally the second polyol. One or more side reactions may also occur. It is also contemplated that any one or more of these reactions may occur sequentially or simultaneously. In various embodiments, the free-radical reaction of the polyester with itself (and optionally the unsaturated monomer) and a polyurethane forming reaction of the isocyanate and the castor oil (and optionally second polyol) occur simultaneously. Any one or more of these reactions may form a cured composition, which may be alternatively described as a hybrid polyurethane-polyester resin In other embodiments, a free-radical polymerization of the polyester with itself and/or with an ethylenically unsaturated monomer, such as styrene (which may be a solvent), vinyl toluene, divinyl benzene, allyl methacrylate, or allyl acrylate, and/or the castor oil, and a polyurethane reaction between the isocyanate and the castor oil, and potentially a second polyol, such as a chain extender, may form the cured composition, i.e., the hybrid polyurethane-polyester resin. The kinetics of the free-radical polymerization reaction is typically controlled by the resin promotion and the amount of the initiator present in the mixture, such as peroxide, as well as by temperature. The kinetics of the polyurethane reaction is typically controlled by the reactivity between the isocyanate and a polyol mixture, the amount of catalyst that may be present in the mixture, such as dibutyltin dilaurate, as well as by temperature.

Isocyanate:

The isocyanate is not particularly limited and may be any known in the art. The isocyanate may be alternatively described as an isocyanate component or a polyisocyanate component that itself includes two or more individual isocyanates.

The isocyanate may be, include, consist essentially of, or consist of, any isocyanate known in the art, e.g. aliphatic isocyanates, aromatic isocyanates, polymeric isocyanates, or combinations thereof. The isocyanate may be, include, consist essentially of, or consist of, more than one different isocyanate, e.g., polymeric diphenylmethane diisocyanate and 4,4'-diphenylmethane diisocyanate. In various embodiments, the isocyanate is chosen from diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

In various embodiments, the isocyanate typically includes, but is not limited to, isocyanates, diisocyanates, polyisocyanates, and combinations thereof. In one embodiment, the isocyanate includes an n-functional isocyanate. In this embodiment, n is a number typically from 2 to 5, more typically from 2 to 4, still more typically of from 2 to 3, and most typically about 2. It is to be understood that n may be an integer or may have intermediate values from 2 to 5. The isocyanate typically includes an isocyanate selected from the group of aromatic isocyanates, aliphatic isocyanates, and combinations thereof. In another embodiment, the isocyanate includes an aliphatic isocyanate such as hexamethylene diisocyanate (HDI), dicyclohexyl-methylene-diisocyanate (H12MDI), isophorone-diisocyanate, and combinations thereof. If the isocyanate includes an aliphatic isocyanate, the isocyanate may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate can include an aromatic isocyanate. If the isocyanate includes an aromatic isocyanate, the aromatic isocyanate typically corresponds to the formula R'(NCO)z wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate includes a diisocyanate selected from the group of methylene diphenyl diisocyanates, toluene diisocyanates, hexamethylene diisocyanates, H12MDIs, and combinations thereof.

The isocyanate may be an isocyanate pre-polymer. The isocyanate pre-polymer may be a reaction product of an isocyanate and a polyol and/or a polyamine. The isocyanate used in the pre-polymer can be any isocyanate as described above. The polyol used to form the pre-polymer may be any polyol having a number average molecular weight of 400 g/mol or greater. For example, polyetherols, polyesterols, and combinations thereof can be used. Castor oil can also be used. Moreover, any one or more of the polyols described in greater detail below can also be used.

Referring back, the isocyanate typically has an NCO content of from 3 to 50, alternatively from 3 to 33, alternatively from 18 to 30, weight percent when tested in accordance with DIN EN ISO 11909, and a viscosity at 25° C. of from 5 to 2000, alternatively from 100 to 1000, alternatively from 150 to 250, alternatively from 180 to 220, mPa·sec when tested in accordance with DIN EN ISO 3219. In alternative embodiments, all values and ranges of values between and including the aforementioned values are hereby expressly contemplated.

In various embodiments the isocyanate is, includes, consists essentially of, or consists of, monomeric and polymeric isocyanate. For example, in one embodiment the isocyanate includes polymeric diphenylmethane diisocyanate and 4,4'-diphenylmethane diisocyanate, and has an NCO content of about 33.5 weight percent. Alternatively, in another embodiment, the isocyanate includes polymeric diphenylmethane diisocyanate and 4,4'-diphenylmethane diisocyanate, and has an NCO content of about 31.3 weight percent. In other embodiments, the isocyanate is a polyfunctional aromatic or aliphatic isocyanate.

The isocyanate can be utilized in the composition in any amount. In various embodiments, the isocyanate is utilized in an amount of from 3 to 12, 4 to 11, 5 to 10, 6 to 9, or 7 to 8, weight percent based on a total weight of the composition. In alternative embodiments, all values and ranges of values between and including the aforementioned values are hereby expressly contemplated.

Polyester Having At Least One Carbon-Carbon Double Bond:

The composition also includes the polyester having at least one carbon-carbon double bond and at least one hydroxyl group. This polyester may be any in the art.

The polyester may be utilized in any amounts. In various embodiments, the polyester is used in an amount of from 70 to 95, 75 to 90, 80 to 85, etc., weight percent based on a total weight of the composition. In various compositions, the polyester is chosen from orthophthalic acid, terephthalic acid, isophthalic acid, maleic acid, fumaric acid, and combinations thereof, e.g. those manufactured by Polynt Composites, Reichhold Chemicals, Inc., Interplastic Corporation, Ashland Inc., and others. In other embodiments, maleic and fumaric polyesters are utilized. The polyester may be further described as a polyester resin. The polyester may be formulated based on a reaction between an alpha- and/or beta-ethylenically unsaturated di- or poly-carboxylic acid, a non-ethylenically unsaturated carboxylic acid, anhydride or derivative thereof and a polyhydric alcohol, such as diethylene glycol.

The polyester typically reacts with itself via a free-radical reaction catalyzed by any free radical initiator known in the art such as peroxides, such as the methyl ethyl ketone peroxide, benzoyl peroxide, tertiary butyl peroxybenzoate, 2,2'-azo-bis-isobutyronitrile, dibenzoyl peroxide, lauryl peroxide, t-butyl peroxy-2-ethylhexonoate, cumene peroxide and others. Suitable promoters are cobalt octoate, N,N-diethylanilin and other tertiary aromatic amines and the like. It is also contemplated that the polyester may react with the unsaturated monomer, if utilized.

Solvent:

The composition also includes a solvent. The solvent may be present independently from any one or more of the other components or may be mixed therewith. For example, the solvent may be added to the composition independently from one or more of the other components or may be added along with one or more other components. The solvent typically has a carbon-carbon double bond or triple bond. In various embodiments, the solvent is chosen from styrene, styrene, vinyl toluene, divinyl benzene, allyl methacrylate, or allyl acrylate, or combinations thereof. The solvent may be utilized in any amounts. In various embodiments, the solvent is used in an amount of from 20 to 70, 25 to 65, 30 to 60, 35 to 55, 40 to 50, or 45 to 55, weight percent based on a total weight of the composition.

Castor Oil:

The composition further includes castor oil. The castor oil that is used may be in any form known in the art. Typically, the castor oil is a liquid but may be utilized as a paste or as a combination of a liquid and a paste. The castor oil is utilized in an amount from 5 to 30 weight percent. In various embodiments, the castor is present in an amount of from 5 to 25, 5 to 20, 5 to 19,5 to 18,5 to 17,6 to 16,7 to 15,8 to 14,9 to 13, 10 to 12, 11 to 12, 11 to 13, 10 to 14, 8 to 16, etc., weight percent based on a total weight of the composition. In alternative embodiments, all values and ranges of values between and including the aforementioned values are hereby expressly contemplated.

The castor oil typically reacts with the isocyanate to form a polyurethane. The kinetics of the polyurethane reaction is governed by the reactivity of the polyol/isocyanate mixture and can also be accelerated by heat and the amount of the appropriate catalyst, such as, for instance, organo-tin compounds such as dibutyitin dilaurate, amines, phosphines, strong bases and acidic metal salts.

Second Polyol:

The composition may also include a second polyol in addition to the castor oil. For purposes of the present disclosure, the term "polyol" is used to describe a molecule that includes one or more hydroxyl functional groups, typically at least two hydroxyl functional groups and have a number average molecular weight of greater than 400 g/mol. In various embodiments, the one or more polyols has an —OH functionality of 2, 3, 4, 5, 6, 7, or 8. In other embodiments, each of the one or more polyols may independently have a nominal hydroxy functionality of from about 2 to about 4, alternatively from about 2.2 to about 3.7, and alternatively of from about 2.5 to about 3.5. Compounds that have only one hydroxyl group may be alternatively described as chain terminators. Similarly, compounds that have only two hydroxyl groups may be alternatively described as chain extenders.

The second polyol may be a polyether polyol, a polyester polyol, a polyether/ester polyol, and combinations thereof. In various embodiments, the second polyol may be chosen from ethylene glycol, diethylene glycol, propylene glycol, butanediol, multifunctional polyether polyols having an OH-functionality of at least 3, and combinations thereof. The second polyol may have a number average molecular weight of from about 62 to about 15,000, alternatively from about 200 to about 7,000, and alternatively from about 600 to about 5,000, g/mol. In another embodiment, the second polyol has a hydroxyl number of from about 20 to about 2000, alternatively from about 30 to about 800, alternatively from about 40 to about 600, alternatively from about 50 to about 500, alternatively from about 55 to about 450, alternatively from about 60 to about 400, alternatively from about 65 to about 300, mg KOH/g. In various embodiments, the second polyol has an OH-index of from 150 to 1000, e.g. from 200 to 500, 250 to 450, 300 to 400, or 350 to 400.

In various embodiments, the second polyol is chosen from conventional polyols, including, but not limited to, biopolyols, such as soybean oil, castor-oil, soy-protein, rapeseed oil, etc., derivatives thereof, and combinations thereof. Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyol copolymers include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In addition, lower molecular weight hydroxyl-functional compounds may also be utilized such as any chain extenders known in the art, ethylene glycol, diethylene glycol, propylene glycol, dipropylene glycol, butane diol, glycerol, trimethylolpropane, triethanolamine, pentaerythritol, sorbitol, and combinations thereof.

In other embodiments, the second polyol is a polyfunctional material having a hydroxyl value from 10 to 2,000 mg KOH/g. In a further embodiment, the second polyol has the hydroxyl value from 100 to 800 mg KOH/g, e.g. from 200 to 600 mg KOH/g. The second polyol may have a weight average molecular weight from 62 to 6,000 g/mole. The second polyol may have a weight average molecular weight from 90 to 1,500 g/mole, e.g. from 200 to 700 g/mole.

Additives:

The composition may also include one or more catalysts. The catalyst is typically present in the composition to catalyze the reaction between the isocyanate and the castor oil and/or second or additional polyols. That is, composition may include a "polyurethane catalyst" which catalyzes the reaction between an isocyanate and a hydroxy functional group. It is to be appreciated that the catalyst is typically not consumed in the exothermic reaction between the isocyanate and the castor oil or polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., organo-tin, organo-bismuth, organo-lead, compounds, etc.

This catalyst may be any in the art. In one embodiment, the catalyst is an amine catalyst. In another embodiment, the catalyst is an organometallic catalyst. The catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the catalyst is or includes dibutyltin dilaurate, which is a dialkyltin(IV) salt of an organic carboxylic acid. Specific examples of non-limiting catalysts are commercially available from Air Products and Chemicals, Inc. of Allentown, Pa., under the trademark DABCO®. The catalyst can also include other dialkyltin (IV) salts of organic carboxylic acids, such as dibutyltin diacetate, dibutyltin maleate and dioctyltin diacetate.

Examples of other suitable but non-limiting catalysts include iron(II) chloride; zinc chloride; lead octoate; tris (dialkylaminoalkyl)-s-hexahydrotriazines including tris(N, N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting catalysts include dimethylaminoethanol, dimethylaminoethoxyethanol, triethylamine, N,N,N',N'-tetramethylethylenediamine, N,N-dimethyl aminopropyl amine, N,N,N',N',N"-pentamethyldipropylenetriamine, tris (dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino) propylimidazole, and combinations thereof. In various embodiments, the catalyst is commercially available from Air Products and Chemicals, Inc. under the trademark POLYCAT®. The catalyst may include any combination of one or more of the aforementioned catalysts. In still other embodiments, the catalyst is chosen from DABCO TMR, DABCO TMR-2, DABCO HE, DABCO 8154, PC CAT DBU TA 1, PC CAT Q1, Polycat SA-1, Polycat SA-102, salted forms, and/or combinations thereof.

In other embodiments, the catalyst is chosen from dibutyltin dilaurate, dibutyltin oxide (e.g. as a liquid solution in $C_8$-$C_{10}$ phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethylti n bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyitin maleate, dibutyltin mercaptopropionate, dibutyltin bis(isoodyithioglycolate), dibutyltin diacetate, dioctyltin oxide mixture, dioctyltin oxide, dibutyltin diisooctoate, dibutyltin dineodecanoate, dibutyltin carboxylate, dioctyitin carboxylate, and combinations thereof.

The catalyst can be utilized in various amounts. For example, in various embodiments, the catalyst is utilized in an amount of from 0.0001 to 10, from 0.0001 to 5, from 5 to 10, weight percent based on a total weight percent of reactants or the isocyanate or any other value or range of values therebetween. In other embodiments, the catalyst is used in amounts of from 0.001 to 1, weight percent based on a total weight percent of reactants or the isocyanate or any other value or range of values therebetween. Typically, an amount of catalyst used depends on a temperature of the process. For example, at 150° F. (~65.5° C.), 0.0001% may be utilized while at room temperature 5-10% may be utilized.

The composition may also include various additional additives. Suitable additives include, but are not limited to, adhesion promoters, air releasing agents, amines, anti-aging agents, anti-foaming agents, anti-oxidants, desiccants such as molecular sieves, chain terminators, chopped glass, coupling agents, dyes, fillers, flame retardants, fumed silica, inert diluents, inert inorganic fillers, lubricants, molecular sieves, pigments, plasticizers, processing additives, reactive inorganic fillers, rheology promoters, silicones, solvents, surface modifiers, surface-active agents, thixotropic agents, transition metals, ultraviolet light stabilizers, water scavengers, waxes, wetting agents, and combinations thereof. The one or more additives can be present in the resin composition in any amount.

Hybrid Polyurethane-Polyester Resin:

The composition of this disclosure can be utilized to form a hybrid polyurethane-polyester resin or article. The resin may be totally cured or partially cured. These resins may be used to form rigid or semi-rigid elastomeric materials and composites, e.g. for use in structural load-bearing applications. Typically, these resins have three major building blocks: the polyester, the isocyanate, and the castor oil.

In various embodiments, the hybrid polyurethane-polyester resin has at least one physical property that is comparable to or even superior to that of typical epoxy or vinyl ester resins. For example flexural strain, as shown in the Examples.

In other embodiments, incorporation of the polyurethane, a poly-functional isocyanate, the castor oil, and/or the second polyol into the polyester network increases the hydrolytic stability and toughness of the hybrid polyurethane-polyester resin. High rigidity and thermal stability of the polyester network may also contribute to the high strength and thermal stability of the hybrid polyurethane-polyester resin.

In various embodiments, the glass transition temperature of the reaction product of the polyester with itself in the hybrid polyurethane-polyester resin is from 70° C. to 135° C. The polyurethane portion of the hybrid polyurethane-polyester resin may have the same or similar glass transition temperature. For this reason, in some embodiments, regardless of the ratio of the polyurethane and the polyester used to synthesize the hybrid polyurethane-polyester resin, final thermal properties may be substantially independent of such a ratio. In other embodiments, mechanical behavior of the hybrid polyurethane-polyester resin may be affected by the ratio of the polyurethane and polyester. In some embodiments, a low ratio leads the hybrid polyurethane-polyester resin to behave more like a polyester, as would be understood by one of skill in the art. In other embodiments, a high ratio leads the hybrid polyurethane-polyester resin to behave more like a polyurethane, as would also be understood by one of skill in the art. The final mechanical properties of the hybrid polyurethane-polyester resin may be adjusted as required by the final application by adjusting the polyurethane to polyester ratio, without substantially changing the thermal properties of such resins.

For example, in various embodiments, the hybrid polyurethane-polyester resin has the following physical properties ±1, 2, 3, 4, 5, 6, 7, 8, 9, or 10%, wherein PU indicates weight percent of polyurethane and PE indicates weight percent of polyester:

TABLE 1

Physical Properties of Neat (Unreinforced) Hybrid Polyurethane-Polyester Resin:

| Weight Percent | Glass Transition, ° C. | Flex Modulus, (psi × 1000) | Flex Strength, (psi × 1000) | Flex Strain, % |
|---|---|---|---|---|
| PU-PE (0-100) | 128 | 654 | 13.2 | 2.1 |
| PU-PE (10-90) | 120 | 549 | 16.3 | 3.1 |
| PU-PE (15-85) | 123 | 495 | 16.6 | 3.7 |
| PU-PE (20-80) | 125 | 456 | 17.5 | 8.1 |
| PU-PE (25-75) | 124 | 390 | 15.3 | 9.2 |
| PU-PE (30-70) | N/A | 295 | 11.4 | 16.0 |

*Tested according to ASTM D790

All values and ranges of values between and including the aforementioned values are hereby expressly contemplated in various non-limiting embodiments.

In various embodiments, when cure times of high glass transition temperature polyurethanes are relatively long (e.g. on the order of tens of minutes), the hybrid polyurethane-polyester resin based on these types of polyurethanes becomes typically reactive with moisture present in environments having high relative humidity. This reaction produces polyurea and carbon dioxide that creates bubbles if the gas becomes trapped in the curing hybrid polyurethane-polyester resin. In many instances, foamed structures are desired as means of producing lightweight insulating materials. In case of rigid structural resins for composite applications, such foamed structures are less preferred. In some embodiments, therefore, it may be best to avoid moisture by using closed system manufacturing methods and by drying all of the materials in contact with the hybrid polyurethane-polyester resin. In various embodiments, the water content of the polyols used is less than 0.5, 0.1, or 0.03, weight percent. Alternatively, open system manufacturing methods may also be used.

An additional advantage is that open mold manufacturing methods may be used, such as hand lay-up, due to the hydrophobic nature of the castor oil component. Open molding techniques are typically those where the reacting resin (i.e. polyurethane/polyester hybrid) can exchange matter (i.e. atmospheric moisture) with its surroundings.

Reactions:

The polyester reaction and the isocyanate/castor oil/second polyol reaction may occur sequentially or simultaneously. In one embodiment, reaction kinetics are controlled by a free-radical reaction (the polyester reaction) and the polyurethane reaction relies on the heat generated from the exotherm of the polyester reaction. In another embodiment, both the polyester and the polyurethane reactions occur substantially simultaneously. In yet another embodiment, the polyurethane reaction may occur first followed by the polyester reaction In addition, secondary reactions may also occur between polyester and polyurethane macromolecules, thereby creating a chemically interpenetrating network. For example, reaction of the isocyanate with optional hydroxyl groups of the polyester may occur thereby forming polyurethane linkages such that a polyester network becomes integrated into a polyurethane. This is shown, for example, in FIG. 1. This Figure also shows a signature of hybrid network formation between the polyester and the isocyanate. Other means of the hybrid network creation is the polymerization reaction across the double bond of the unsaturated polyester and those of the castor oil in presence of an olefinically unsaturated monomer. The hybrid network may also be hydrogen bonded between the polyurethane and the polyester moieties.

Alternatively, an unsaturated styrenated polyester can react with an ethylenically unsaturated second polyol via either the free-radical reaction by chain transfer or via propagation of the styrene chains across the conjugated system. The kinetics of the two chemically interpenetrating routes typically depends on the molecular structure of the second polyol, the level of the unsaturation and the hydroxyl functionality of the unsaturated polyester, as well as on thermodynamic conditions.

In other embodiments, the reaction sequence and type determines the nature of an interpenetrating macromolecular network formed upon the cure of the hybrid composition. In the absence of hydroxyl functionality of the polyester, and, for example, in case of a saturated second polyol, a physical interpenetrating network may form as a result of two reactions: the free-radical polymerization of the polyester and the polyurethane reaction. The castor oil may also participate.

In still other embodiments, a chemical interpenetrating network is formed in addition to a physical network, so that synergies in the final properties of the cured composition can be realized. For example, it may be typical that the polyester has a hydroxyl value greater than 3 mg KOH/g, e.g. greater than 10 or greater than 20. At the same time, owing the nature of the synthesis that typically involves a reaction of a dicarboxylic acid with a diol, the resultant polyester may have variable levels of hydroxyl and acid values. In some embodiments, it is typical that the polyester has the high hydroxyl value to be able to react with the isocyanate. It may also be typical that an acid value of the polyester be as low as possible to avoid the reactions with the isocyanate that would lead to carbon dioxide formation. In still other embodiments, it is typical that the polyester has an acid value less than 20 mg KOH/g, e.g. less than 10 or 5.

Methods:

This disclosure also provides various methods of forming the hybrid composition. In one embodiment, the method includes the steps of combining the isocyanate and the castor oil to form a first adduct, combining the polyester, the solvent, and the catalyst to form a second adduct, and combining the first adduct and the second adduct to form the hybrid composition.

In another embodiment, the method includes the steps of combining the castor oil, the solvent, and the polyester to form a third adduct, combining the third adduct with the isocyanate, and combining the catalyst with the third adduct and the isocyanate to form the hybrid composition.

In a further embodiment, the method includes the steps of combining castor oil, the solvent, and the polyester to form the third adduct, combining the catalyst and the isocyanate component to form a fourth adduct, and combining the third and fourth adducts to form the hybrid composition.

This disclosure also provides a method of forming an article from the hybrid composition. The method may include any of the aforementioned steps and further includes the step of (A) applying the hybrid composition to a glass fiber reinforcement using hand lay-up open molding; or (B) applying the hybrid composition to a glass fiber reinforcement using semi-closed vacuum infusion; or (C) applying the hybrid composition to a glass fiber reinforcement using semi-closed compression molding; or (D) applying the hybrid composition to a glass fiber reinforcement using a closed mold resin transfer molding process.

In any of these methods, the amounts of any of the components may be as described above. Moreover, within any of the steps of the methods, the components may be combined in one or more portions, batch-wise or continuously, simultaneously or sequentially. All combinations of steps of mixing or combining any one or more of the aforementioned components are hereby expressly contemplated in one or more non-limiting embodiments. Moreover, the details of any one or more of the aforementioned steps may be determined by one of skill in the art and all such steps and combinations thereof are hereby expressly contemplated in various non-limiting embodiments.

Additional Embodiments:

In additional embodiments, the hybrid polyurethane-polyester resin exhibit the properties of the polyesters and that of the polyurethanes in that such hybrid polyurethane-polyester resins exhibit high rigidity, while remaining substantially tough and elastomeric. For example, typical properties of cured polyesters include a flexural modulus of about $4.5 \times 10^5$ to $6.5 \times 10^5$ psi and flexural strength of $1.1 \times 10^4$ to $1.8 \times 10^4$ psi, and an elongation to failure of from 1-3%. A hybrid system based on such polyesters, however, typically exhibits a comparable flexural modulus of about $5 \times 10^5$ psi, but has a superior flexural strength of about $2 \times 10^6$ psi and a significantly superior strain to failure of 9%. In various embodiments, the hybrid composition is to have a flexural modulus of from $4.5 \times 10^5$ to $6.5 \times 10^5$ psi as determined by ASTM3039, a flexural strength of $1.5 \times 10^4$ to $3.0 \times 10^4$ psi as determined by ASTM 3039, and a strain to failure of from 5 to 15% as determined by ASTM 3039.

In some embodiments, the cure of the hybrid polyurethane-polyester resin can be adjusted by accelerating the curing kinetics of the polyester, the polyurethane, or both.

In one particular embodiment, the hybrid polyurethane-polyester resin system remains substantially insensitive to moisture, allowing for extended work like under conditions of high humidity.

In other embodiments, the polyurethane reaction as well as the free-radical polymerization of the polyester occurs substantially at the same time, forming a chemically and physically interpenetrating network of the molecular chains by these two classes of materials. In some embodiments, this is due to chemical interpenetration obtained when reacting the two chemistries in the same curing cycle.

In other embodiments, the hybrid polyurethane-polyester resin is prepared by mixing the castor oil and the isocyanate at a NCO/OH index in the range between 0.9 and 2 to form an adduct (A). Separately, a free radical catalyst may be added to a promoted styrenated unsaturated polyester resin at a level between 0.2 and 5% wt to form an adduct (B). The hybrid polyurethane-polyester resin may then prepared by blending the (A) and (B) adducts. This is a 4-component scheme.

In another embodiment, the castor oil is mixed with a promoted styrenated unsaturated polyester resin to form adduct (C). This mixture is substantially unreactive so it can be stored for an extended time periods. The hybrid polyurethane-polyester resin is then prepared by adding adduct (C) directly to the isocyanate, followed by the addition of a free radical catalyst. This is a 3-component scheme.

In yet another embodiment, a free radical catalyst may be added to the isocyanate to form adduct (E). In this embodiment, the hybrid polyurethane-polyester resin is produced by mixing adducts (C) and (E). This is a 2-component scheme. Typically, regardless of the scheme, the physical properties of the hybrid polyurethane-polyester resin remain substantially the same.

Article:

The hybrid composition may be utilized to form an article. For example, one or more of the aforementioned methods may be used. The article is not particularly limited and may be a load-bearing article. For example, the article may be further defined as a floor, bridge, road bed, trailer bed, or table. The article may be rigid or semi-rigid, as would be understood by those of skill in the art.

EXAMPLES

Various non-limiting examples of the hybrid composition are formed and evaluated. The examples are made using a polymethylene poly(phenylisocyanate) of % NCO 31.5 and viscosity of 200 mPaS (7.9 parts by weight), castor oil (urethane grade, 12.1 parts by weight), Aropol 70472 unsaturated polyester resin (80 parts by weight), and DDM-9 peroxide (1.5%, based on the weight of the Aropol 70472/castor oil blend). The Aropol 70472, castor oil and isocyanate are blended and the DDM-9 added with stirring. This blend is then degassed under vacuum to remove dissolved gasses. Random glass fiber mats are then infused with the blend using standard vacuum infusion techniques. Identical samples are also made using CORVE 8101-45SS vinyl ester resin (Interplastics) for comparison. The glass sheets are laid out in the architecture shown in Table 2. The resultant samples are post-cured at 50° C. for 4 hrs, 80° C. for 4 hrs, 100° C. for 4 hours and 120° C. for 2 hrs. After conditioning at room temperature for at least 1 week, test specimens are cut and tested for tensile strength, tensile modulus and tensile elongation according to ASTM 3039.

Examples (Hybrid Resin with Glass Reinforcement)

TABLE 2

Glass mat orientation (Architecture) and measured fiber volume fraction.

| Hybrid Resin Laminates (with glass): Architecture type | Architecture Definition | Obtained FiberVolume Fraction (%) | |
|---|---|---|---|
| | | Hybrid Resin | Vinyl Ester |
| Uniaxial (Uni-) | [0/stab]$_2$ | 45.1 | 44.8 |
| Biaxial (Bi-) | [0/90]$_4$ | 40.2 | 38.9 |
| Triaxial (Tri-) | [+45/90/−45]$_4$ | 54.1 | 51.4 |
| Quadraxial (Quad-) | [0/+45/90/−45]$_2$ | 54.0 | 50.7 |

TABLE 3

Tensile test results in the 0° ("warp") orientation.

| Properties of the laminate w/ defined archtecture | Hybrid Resin | | | | Vinyl Ester | | | |
|---|---|---|---|---|---|---|---|---|
| | Uni- | Bi- | Tri- | Quad- | Uni- | Bi- | Tri- | Quad- |
| Tensile Strength (psi × 1000) | 111.22 | 52.96 | N.A | 54.97 | 105.85 | 46.86 | N.A | 53.03 |
| Tensile Modulus (psi × 1000000) | 4.71 | 2.96 | N.A | 3.07 | 4.53 | 2.83 | N.A | 3.13 |
| Tensile Strain (%) | 2.36 | 1.79 | N.A | 1.79 | 2.34 | 1.65 | N.A | 1.70 |

TABLE 4

Tensile test results in the 90° ("fill") orientation.

| Properties of the laminate w/ defined architecture | Hybrid Resin | | | | Vinyl Ester | | | |
|---|---|---|---|---|---|---|---|---|
| | Uni- | Bi- | Tri- | Quad- | Uni- | Bi- | Tri- | Quad- |
| Tensile Strength (psi × 1000) | 11.02 | 58.58 | 83.56 | 52.83 | 12.15 | 53.66 | 80.02 | 49.36 |
| Tensile Modulus (psi × 1000000) | 1.76 | 2.88 | 3.72 | 2.93 | 1.86 | 2.91 | 3.78 | 2.96 |
| Tensile Strain (%) | 0.63 | 2.04 | 2.24 | 1.80 | 0.65 | 1.85 | 2.11 | 1.67 |

TABLE 5

Tensile test results in the 45° orientation.

| Properties of the laminate w/ defined architecture | Hybrid Resin | | | | Vinyl Ester | | | |
|---|---|---|---|---|---|---|---|---|
| | Uni- | Bi- | Tri- | Quad- | Uni- | Bi- | Tri- | Quad- |
| Tensile Strength (psi × 1000) | N.A | N.A | 54.31 | 54.71 | N.A | N.A | 51.87 | 53.36 |
| Tensile Modulus (psi × 1000000) | N.A | N.A | 3.04 | 3.02 | N.A | N.A | 3.24 | 3.15 |
| Tensile Strain (in %) | N.A | N.A | 1.78 | 1.81 | N.A | N.A | 1.66 | 1.70 |

N.A-Data not applicable, as no fibers are present along this direction

The results above for these examples demonstrate that the hybrid composition exhibits physical properties as good as or better (in most cases) than vinyl ester comparisons.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A hybrid composition comprising:
   an isocyanate;
   a polyester polyol having at least one carbon-carbon double bond and at least one hydroxyl group;
   a second polyol chosen from ethylene glycol, diethylene glycol, propylene glycol, butanediol, multifunctional polyether polyols having an OH-functionality of at least 3, and combinations thereof;
   castor oil present in an amount of from 5 to 30 weight percent based on a total weight of said hybrid composition;
   a catalyst; and
   a solvent.

2. The hybrid composition of claim 1 wherein the castor oil is present in an amount of from 5 to 10 weight percent based on a total weight of said hybrid composition.

3. The hybrid composition of claim 1 wherein said polyester polyol is present in an amount of from 35 to 55 weight percent based on a total weight of said hybrid composition.

4. The hybrid composition of claim 1 wherein said polyester polyol is present in said solvent and the combination of said polyester polyol and said solvent is present in an amount of from 70 to 95 weight percent based on a total weight of said hybrid composition.

5. The hybrid composition of claim 1 wherein said polyester polyol is derived from orthophthalic acid, terephthalic acid, isophthalic acid, maleic acid, fumaric acid, and combinations thereof.

6. The hybrid composition of claim 1 wherein said isocyanate is present in an amount of from 3 to 12 weight percent based on a total weight of said hybrid composition and is chosen from diphenylmethane diisocyanate, polymeric diphenylmethane diisocyanate, toluene diisocyanate, hexamethylene diisocyanate, isophorone diisocyanate, and combinations thereof.

7. The hybrid composition of claim 1 wherein said catalyst is present in an amount of from 0.7 to 3 weight percent based on a total weight of said hybrid composition.

8. The hybrid composition of claim 1 wherein said catalyst is a peroxide.

9. The hybrid composition of claim 1 wherein said second polyol is present in an amount of up to 20 weight percent based on a total weight of said hybrid composition.

10. The hybrid composition of claim 1 that cures to form a polyester-polyurethane hybrid having a weight ratio of polyurethane:polyester of from 10:90 to 40:60.

11. The hybrid composition of claim 1 that cures to have a flexural modulus of from $4.5 \times 10^5$ to $6.5 \times 10^5$ psi as determined by ASTM3039, a flexural strength of $1.5 \times 10^4$ to $3.0 \times 10^4$ psi as determined by ASTM 3039, and a strain to failure of from 5 to 15% as determined by ASTM 3039.

12. A polyester-polyurethane hybrid formed from the hybrid composition of claim 1.

13. An article comprising said polyester-polyurethane hybrid of claim 12 that is optionally a load-bearing article.

14. A method of forming the article of claim 13, said method comprising the steps of:
   A. applying the hybrid composition to a glass fiber reinforcement using hand lay-up open molding;
   B. applying the hybrid composition to a glass fiber reinforcement using semi-closed vacuum infusion; and
   C. applying the hybrid composition to a glass fiber reinforcement using semi-closed compression molding; or
   D. applying the hybrid composition to a glass fiber reinforcement using a closed mold resin transfer molding process.

15. A method of forming the hybrid composition of claim 1, said method comprising the steps of:
   A. combining the isocyanate and the castor oil to form a first adduct;
   B. combining the polyester polyol, the solvent, and the catalyst to form a second adduct;
   C. combining the first adduct and the second adduct to form the hybrid composition.

16. The method of claim 15 wherein the castor oil is present in an amount of from 5 to 10 weight percent based on a total weight of the hybrid composition, the polyester polyol is present in the solvent and the combination of the polyester polyol and said solvent is present in an amount of from 70 to 95 weight percent based on a total weight of the hybrid composition, and the isocyanate is present in an amount of from 3 to 12 weight percent based on a total weight of the hybrid composition.

17. A method of forming the hybrid composition of claim 1, said method comprising the steps of:
   A. combining the castor oil, the solvent, and the polyester polyol to form a third adduct;
   B. combining the third adduct with the isocyanate;
   C. combining the catalyst with the third adduct and the isocyanate to form the hybrid composition.

18. A method of forming the hybrid composition of claim 1, said method comprising the steps of:
   A. combining castor oil, the solvent, and the polyester polyol to form a third adduct;
   B. combining the catalyst and the isocyanate component to form a fourth adduct;
   C. combining the third and fourth adducts to form the hybrid composition.

* * * * *